United States Patent [19]

Seese et al.

[11] 4,226,743

[45] Oct. 7, 1980

[54] SILICA-ALUMINA HYDROGEL CATALYST

[75] Inventors: Mark A. Seese, Ellicott City; Edwin W. Albers, Annapolis; John S. Magee, Jr., Ellicott City, all of Md.

[73] Assignee: W. R. Grace & Co., New York, N.Y.

[21] Appl. No.: 19,676

[22] Filed: Mar. 12, 1979

[51] Int. Cl.$^2$ .................... B01J 37/02; B01J 29/04; B01J 29/06

[52] U.S. Cl. .............................. 252/453; 252/455 R; 252/455 Z

[58] Field of Search ............... 252/453, 455 R, 455 Z

[56] References Cited

U.S. PATENT DOCUMENTS

| | | | |
|---|---|---|---|
| 3,260,681 | 7/1966 | Sanford et al. .................. | 252/453 X |
| 3,414,525 | 12/1968 | Michalko ............................. | 252/453 |
| 3,872,029 | 3/1975 | Takase et al. ........................ | 252/453 |
| 3,912,619 | 10/1975 | Magee, Jr. et al. ............. | 252/455 R |
| 3,974,099 | 8/1976 | Lussier et al. ....................... | 252/453 |
| 4,144,194 | 3/1979 | Guidry ................................. | 252/451 |

*Primary Examiner*—Carl F. Dees
*Attorney, Agent, or Firm*—Arthur P. Savage

[57] ABSTRACT

A dense, attrition resistant catalyst is prepared by precipitating a silica alumina hydrogel at high pH, and subsequently reacting the alkaline hydrogel with sufficient acid aluminum salt at a pH below 4 to obtain an acidic hydrogel slurry. The slurry is then processed into a catalyst by spray drying, washing and ion exchanging. The catalyst may include substantial quantities of clay and/or crystalline aluminosilicate zeolites.

8 Claims, 2 Drawing Figures

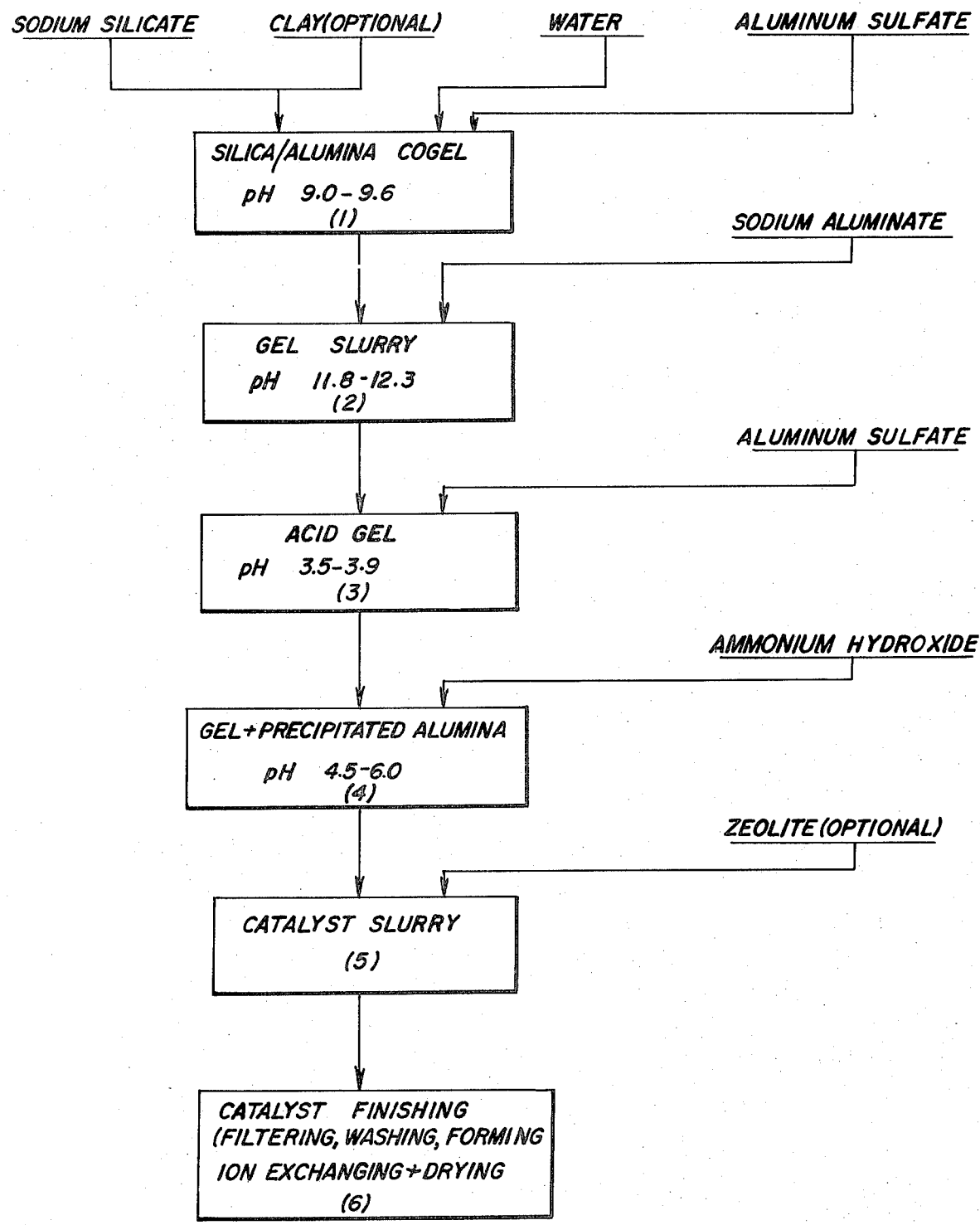

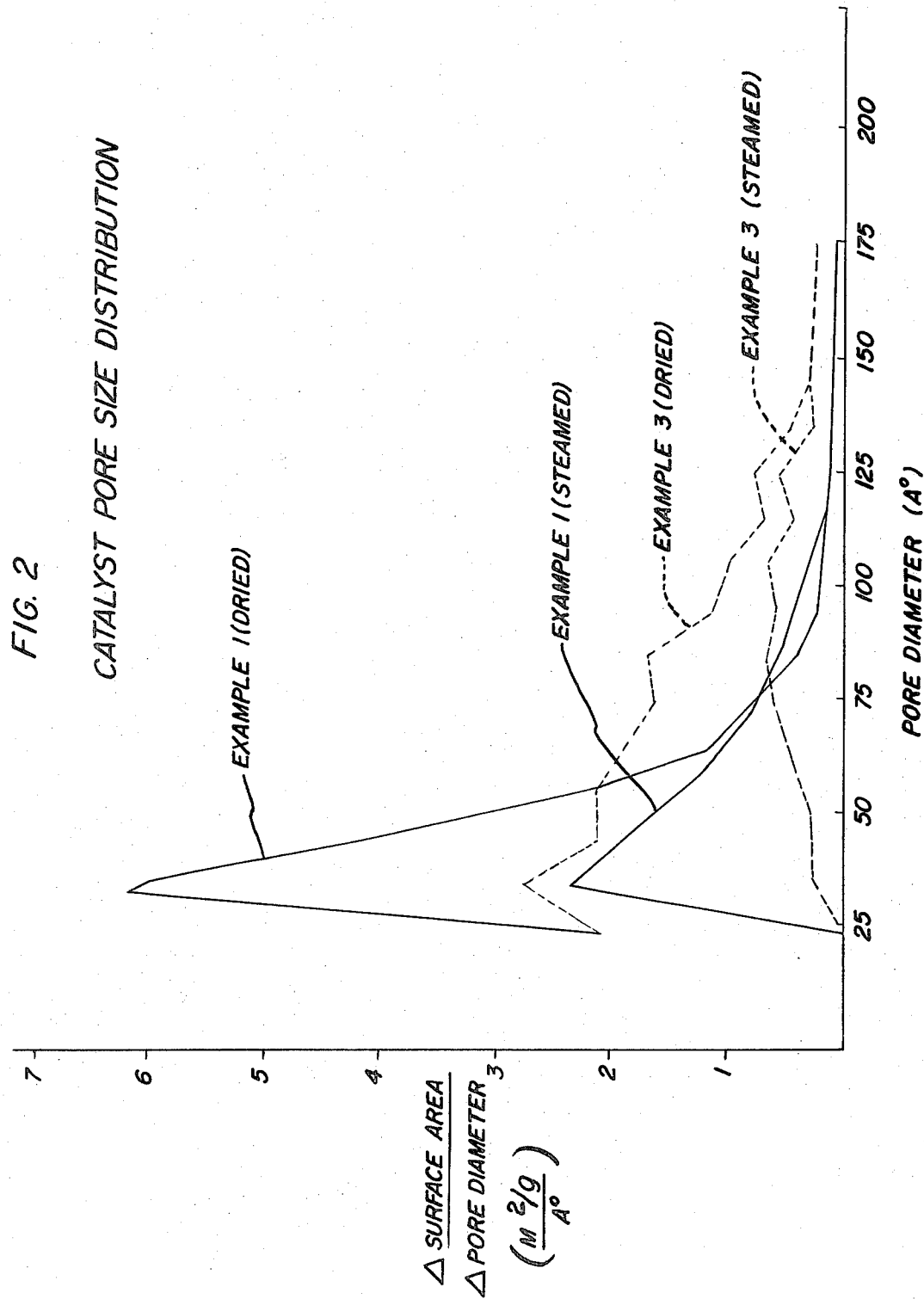

SILICA-ALUMINA HYDROGEL CATALYST

The present invention relates to the preparation of hydrocarbon cracking catalysts, and more specifically, to silica alumina hydrogel cracking catalysts which may contain substantial quantities of clay and/or crystalline alumino-silicate zeolites.

Hydrocarbon cracking catalysts which comprise silica alumina hydrogel are generally prepared by reacting a soluble source of silica, such as sodium silicate with a reactive form of alumina, such as aluminum sulfate and/or sodium aluminate. The physical and catalytic properties of a silica alumina hydrogel catalyst are controlled not only by the quantities or ratios of the various reactive components, but also by the manner in which they are combined.

U.S. Pat. No. 3,650,988 to Magee, et al, discloses preparation of a relatively low surface area attrition resistant silica alumina hydrogel catalyst by gelling in alkali metal silicate solution at a pH of 9-12 by the addition of an acid or an acid salt. An alkali metal aluminate solution is added to the gelled silicate and the mixture is aged prior to the addition of aluminum sulfate, which is added to impart the desired alumina concentration to the hydrogel. The pH of the hydrogel is adjusted to about 6-9 by the addition of ammonia, and the zeolite is added.

U.S. Pat. No. 3,912,619 to Magee et al discloses a process for preparing a low surface area hydrogel catalyst wherein most of the pore volume is located in pores of about 45-125 Å° in diameter. The catalyst is prepared by reacting sodium silicate with aluminum sulfate solution to obtain a gelled mixture having a pH of 9.5-11. The mixture is aged for about 5 to 60 minutes and combined with additional aluminum sulfate or sodium aluminate to obtain the desired alumina content.

Commercially available hydrocarbon cracking catalysts are in general highly active, and relatively attrition resistant and dense. However, due to increasing emphasis on maintaining or achieving minimum catalyst losses to the atmosphere, there is a substantial demand for fluid cracking catalysts having still higher density and attrition resistance. Furthermore, there is a substantial demand for thermally and hydrothermally stable fluid cracking catalysts which maintain a high degree of activity over extended periods.

It is therefore an object of the present invention to provide an improved fluid cracking catalyst which is thermally and hydrothermally stable, dense and attrition resistant.

It is a further object to provide a commercial manufacturing process by which stable, attrition resistant silica alumina hydrogel catalysts may be prepared which utilize inexpensive, readily available raw materials.

These objects will become readily apparent from the following detailed description and drawings wherein:

FIG. 1 is a flow sheet which outlines a catalyst preparation process of the present invention; and FIG. 2 is a graphic comparison of the pore size distribution of a catalyst of the present invention, and a catalyst of the prior art both before and after steam deactivation.

Broadly, our invention contemplates a catalyst manufacturing process wherein sodium silicate is reacted with aluminum sulfate and sodium aluminate to obtain a hydrogel at high pH, and thereafter further reacting the hydrogel with aluminum sulfate solution to obtain a hydrogel slurry having a pH of below 4. The hydrogel slurry is then combined with an inorganic base such as ammonium hydroxide and/or sodium hydroxide to complete precipitation of soluble aluminum ions at a pH of about 4.5 to 6.0. Clay and/or zeolite may be added at any point in the process to obtain desired catalytic properties. The hydrogel is processed into a suitable particulate catalyst by filtering, washing, forming and ion exchanging.

More specifically, we have found that a highly active attrition resistance cracking catalyst may be obtained by the process outlined in FIG. 1. Reference to FIG. 1 reveals that in step (1) sodium silicate, water, aluminum sulfate and optionally, clay, are combined to form a silica alumina co-gel at a pH of about 9.0 to 9.6. The sodium silicate is preferably added in the form of a sodium silicate solution which is prepared by combining sodium silicate having the mol formula 0.3 to 1 $Na_2 \cdot SiO_2$ with water to obtain a solution having from about 3.5 to 5.5 percent $SiO_2$. The aluminum sulfate solution is prepared by combining aluminum sulfate which has the mol formula 1 to 3 $Al_2O_3 \cdot SO_4$ with water to obtain a solution of from 2.0 to 8.0 percent alumina ($Al_2O_3$). In the event clay is used in the preparation of the initial silica alumina cogel, the clay is conveniently added in combination with the sodium silicate solution. In general, the quantity of sodium silicate and aluminum sulfate combined to form the initial cogel, is sufficient to provide a mole ratio of $SiO_2$ to $Al_2O_3$ which ranges from about 15 to 18.

The silica alumina cogel is then combined, as shown in step (2) of FIG. 1, with sodium aluminate solution to obtain a gel slurry having a pH of 11.8 to 12.3. The sodium aluminate will have the mol composition 1.4 to 1 $Na_2O \cdot Al_2O_3$ molar ratio and is prepared by combining aluminum trihydrate with NaOH and water to obtain a solution having from about 20 to 24 weight percent $Al_2O_3$.

The gel slurry obtained in step (2) is then combined with additional aluminum sulfate solution at step (3) to obtain an acid gel having a pH of about 3.5 to 3.9. This acid gel will contain a silica to alumina (synthetic portion) mol ratio of about 2.3 to 3.3 wherein from about 28 to 40 percent of the alumina content is contributed by sodium aluminate.

As shown in step (4) of FIG. 1, ammonium hydroxide is combined with the acid gel of step (3) to obtain precipitated alumina at a pH of from about 4.5 to 6.0. Preferably, the precipitated alumina is obtained by the addition of an inorganic base such as ammonium hydroxide. However, it is contemplated that other inorganic bases such as sodium hydroxide may be added to increase the pH of the acid gel to about 4.5 to 6.0, which results in precipitation of the alumina.

The gel containing the precipitated alumina obtained in step (4) comprises a catalyst slurry which is then optionally combined with a crystalline aluminosilicate zeolite as shown in step (5). The zeolite which is added at step (5) may comprise a Type Y or Type X zeolite in either the sodium or metal ion exchanged form. Furthermore, the zeolite may comprise thermally or chemically modified zeolites such as calcined rare-earth exchanged Type X or Y zeolite (CREX or CREY) prepared by way of the method set forth in U.S. Pat. No. Re. 28,629 to Maher and McDaniel, or the catalyst may include a Z14 US type zeolite such as shown in the U.S. Pat. No. 3,293,192 and 3,449,070 to McDaniel et al. The quantity of zeolite added to the catalyst slurry at this point may range from about 10 to 30 percent by weight of the finished catalyst.

The catalyst slurry obtained in step (5) of FIG. 1 is then subjected to a conventional catalyst finishing procedure of step (6) which typically involves recovering the solid catalyst by filtration, washing to remove excess soluble ions such as sulfate and sodium, forming the catalyst by spray drying to otain a fluidized particle size or pelleting to obtain a moving bed type catalyst, ion exchanging with ions such as rare earth, calcium or magnesium, optionally impregnating the catalyst with $SO_2$ oxidant, octane enhancing and/or CO combustion promoter additives such as platinum and/or palladium in amounts ranging from about 0.01 to 100 ppm and finally drying the catalyst to obtain a total volatiles content ranging from about 10 to 20 weight percent.

Typically, the catalyst prepared by our process will comprise from about 0 to 23 percent clay, from about 0 to 30 percent zeolite, from about 0 to 23 percent by weight alumina in the form of particulate alumina such as alpha alumina trihydrate, with the balance comprising the silica-alumina gel composition prepared by our novel process.

The silica-alumina gel catalyst obtained by our process possesses a unique pore volume distribution which is shown in FIG. 2. FIG. 2 plots incremental changes in surface area divided by corresponding changes in pore diameter versus the pore diameter. As shown in the curves set forth in FIG. 2 a catalyst of the present invention (solid line) possesses a substantial surface area in the pore diameter range of from about 25 to 75 A°. Furthermore, it is noted that upon steam deactivation the catalyst pore size distribution curve remains similar in shape (at reduced level) to that of the fresh catalyst.

Our hydrogel catalysts will typically possess a fresh total surface area of from about 110 to 200 $m^2/g$ and a nitrogen pore volume of from about 0.08 to 0.25 cc/g and a water pore volume of about 0.20–0.35 cc/g. Catalysts of the present invention which include zeolite and clay, will possess a bulk density of from about 0.64 to 0.78 g/cc and an attrition characteristic (Davison Index) of from about 8 to 28 as determined by the standard testing method disclosed in U.S. Pat. No. 3,650,988.

While it is generally contemplated the present silica alumina hydrogels will be combined with clay and/or zeolite to obtain a zeolite promoted catalytic cracking catalyst, it is also contemplated that our silica alumina hydrogel may be used in the preparation of other catalysts. Furthermore, the hydrogel catalysts of the present invention may be used as amorphous cracking catalysts without the addition of zeolite or clay.

Having described the basic aspects of the invention, the following examples are given to illustrate specific embodiments thereof.

EXAMPLE 1

A catalyst which contained 65 percent silica alumina hydrogel of the present invention, 14.5 percent by weight of a rare-earth exchanged Type Y zeolite and 20.5 weight percent kaolin clay was prepared using the procedure generally outlined in the FIG. 1. Specifically, a sodium silicate solution having 4.0 percent by weight of $SiO_2$ and 1.4 percent by weight of $Na_2O$ was combined with commercially available kaolin. The resulting slurry contained 21.1 g ($SiO_2$-$Al_2O_3$ basis) clay per liter. The silicate/clay slurry was pumped into a centrifugal pump reactor at the rate of 3785 ml solution per minute. At the same time, dilute aluminum sulfate, $Al_2(SO_4)_3.18H_2O$ solution containing 28 g $Al_2O_3$ per liter was pumped into the same centrifugal pump at a rate of 600 ml per minute. The reaction mixture which had a pH of 9.1 formed a semi-rigid gelled slurry. The gelled slurry was aged, with agitation, for 15 minutes at 35° C. Thereafter, 2470 g of sodium aluminate, $NaAlO_2$, solution containing 24 percent by weight of $Al_2O_3$ was added to the slurry whereupon the pH increased to 12.1. The slurry was then aged, with agitation, at 35° C. for 15 minutes, after which time the pH decreased to 12.0. Then, 13,448 ml of aluminum sulfate solution containing 77.2 g $Al_2O_3$ per liter was added to the slurry at which time the pH decreased to 3.8. The acidic gel slurry was then aged for 20 minutes at 35° C. and with agitation after which time the pH dropped to 3.7. A solution of dilute ammonium hydroxide (14% $NH_4OH$) was then added slowly to the agitating slurry. This addition increased the pH to 5.5 with a consequent precipitation of soluble aluminum ions. Then 1160 g ($SiO_2$-$Al_2O_3$) basis of a commercial NaY zeolite, i.e. a synthetic Y type sodium faujasite having a silica to alumina ratio of 4.9, was blended with a suitable amount of deionized water to yield a freeflowing slurry. The zeolite slurry was added to the gelled slurry with agitation. The resulting catalyst slurry was filtered to obtain a catalyst filter cake. The filter cake was reslurried in water to a level of 12 weight percent solids and then spray dried to obtain microspheres 20–80 microns in diameter. 3000 g of the microspheres were then washed with water and ammonium sulfate solution. The catalyst was exchanged with rare-earth chloride solution and then rinsed with water which was adjusted to a pH of 6.0–7.0 with dilute ammonium hydroxide solution. The catalyst was then dried in a forced draft oven for 16 hours at 177° C. The analytical and catalytic data describing this catalyst is set forth in the Table following Example 4.

EXAMPLE 2

A cracking catalyst which comprised 65 weight percent silica alumina hydrogel, 12 weight percent of a calcined rare earth exchanged Type Y zeolite (CREY) and 23 weight percent kaolin clay was also prepared using the procedure set forth in Example 1. The silicate/clay slurry component comprised 23.7 g kaolin ($SiO_2$-$Al_2O_3$ basis) per liter of 4.0 percent $SiO_2$ solution. The zeolite component comprised 960 g of CREY. Analytical and catalytic performance data describing this catalyst is set forth in the Table following Example 4.

EXAMPLE 3

To compare the novel catalysts prepared in Examples 1 and 2 with a catalyst prepared by a procedure which does not include the critical combination of the use of high pH at step (2) and the final addition of aluminum sulfate at step (3) to obtain a hydrogel slurry at pH below 4, a comparison catalyst was prepared as follows:

A sodium silicate solution containing 4 percent by weight silica and 1.4 percent by weight $Na_2O$ was combined with an aluminum sulfate, $Al_2(SO_4)_3.18H_2O$ solution which contained 10 to 90 g/l $Al_2O_3$. Sufficient aluminum sulfate was added to neutralize about 55 percent by weight of the $Na_2O$ in the silicate solution and provide a pH of about 9.5 to 10. The mixture was then aged for 15 minutes at 35° C. Subsequently, sodium aluminate, $NaAlO_2$, solution containing 24 percent by weight of $Al_2O_3$ was added to the slurry. The sodium aluminate represented 25 percent of the total synthetic $Al_2O_3$ in the catalyst. The resultant pH was 11.5. This slurry was then further aged at 35° C. for 15 minutes after which the remaining $Al_2O_3$ required to form a 25 percent $Al_2O_3$ silica-alumina hydrogel was added in the form of aluminum sulfate $(Al_2(SO_4)_3.18H_2O)$. At this point the pH was 4.2. The slurry was then aged for 20 minutes at 35° C. The pH of the slurry was raised to 6.0 with addition of 28 weight percent ammonium hydroxide solution and aged for 5 minutes with agitation. Commercially available NaY zeolite, i.e., a synthetic Y type sodium faujasite having a silica to alumina ratio of 4.9, was added to the slurry. The amount of NaY zeolite added requested 15.7 percent of the catalyst on a silica-alumina basis. The catalyst mixture was then filtered, reslurried in water, and spray dried. The spray dried microspheroidal catalyst was then washed with water and ammonium sulfate solution and exchanged with rare-earth chloride solution. Analytical and catalytic data describing this catalyst is summarized in the Table following Example 4.

EXAMPLE 4

To compare attrition resistance, density, catalytic activity and thermal stability of the catalysts prepared in Examples 1, 2 and 3, the catalysts were subjected to standard microactivity testing subsequent to steam deactivation and to attrition resistance determinations. The comparison of the physical and catalytic properties of the catalyst is set forth in the table below:

TABLE

| Catalyst | (Example) 1 | 2 | 3 |
|---|---|---|---|
| Components (wt. %) | | | |
| Silica alumina hydrogel | 65. | 65. | 62. |
| Zeolite | 14.5 | 12. | 15.7 |
| Clay | 20.5 | 23. | 22.3 |
| Chemical Composition (wt. %) | | | |
| $Al_2O_3$ | 33.7 | 39.5 | 27.8 |
| $Na_2O$ | 0.30 | 0.06 | 0.43 |
| $SO_4$ | 1.18 | 3.88 | 0.17 |
| $RE_2O_3$ | 4.29 | 1.64 | 4.57 |
| Physical Properties | | | |
| Surface area ($m^2/g$) | 204. | 141. | 277. |
| Pore Volume ($N_2$-cc/g) | 0.22 | 0.11 | 0.36 |
| Pore Volume ($H_2O$-cc/g) | 0.30 | 0.24 | 0.45 |
| Bulk Density (g/cc) | 0.74 | 0.76 | 0.55 |
| Compacted Density (g/cc) | 0.91 | 0.97 | 0.72 |
| Attrition: | | | |
| Davison Index (DI) | 17. | 20. | 25. |
| Jersey Index (JI) | 1.4 | 1.4 | 2.8 |
| Catalytic Properties | | | |
| Activity (vol. % conversion) | 69. | 69. | 67. |

Catalytic activity of the catalysts was determined using the microactivity test outlined by Ciapetta and Henderson, Oil and Gas Journal, Oct. 6, 1967. The catalyst samples were first subjected to a 3 hour 538° C. thermal treatment and an 8 hour 732° C., 15 psig steam treatment and tested at 482° C. using a 16 weight hour space velocity (WHSV) and 3 catalyst to oil ratio and a light West Texas Devonian Oil fraction boiling at 260° to 427° C. Review of the data set forth in the Table indicates that the catalysts prepared by way of novel procedure set forth in Examples 1 and 2 possess superior attrition resistance, density and activity over a catalyst prepared by the process set forth in Example 3.

EXAMPLE 5

To illustrate the unique pore structure and superior hydrothermal stability of our catalysts, the pore size distribution (PSD) characteristics of the novel catalyst of Example 1 was compared with the characteristics of a commercial catalyst prepared by a method similar to that set forth in Example 3. The data is summarized in the graph set forth in FIG. 2. The solid lines represent the PSD curves for the catalyst of Example 1 both after drying at 538° C. (upper curve) and after steaming at 827° C. in 20 percent steam for 5 hours (lower curve). The dash lines represent similar data obtained from testing the commercial catalyst. The data set forth in FIG. 2 clearly illustrates that the catalyst of the present invention possesses a substantial pore structure at about 35 A° pore diameter both before and after hydrothermal treatment, whereas the commercial catalyst loses most all of the 35 A° pore structure after similar treatment.

The above description and specific examples and drawings clearly indicate that valuable catalysts may be obtained by practice of the present invention.

We claim:
1. A process for preparing a silica-alumina hydrogel catalyst which comprises:
    (a) reacting solutions of sodium silicate and acid aluminum salt at a pH of about 9.0 to 9.6 to obtain a silica-alumina cogel;
    (b) reacting said silica-alumina cogel with sodium aluminate solution to obtain an alkaline gel slurry having a pH of about 11.8 to 12.3;
    (c) reacting said gel slurry with an acid aluminum salt to obtain an acid gel slurry having a pH of below 4;
    (d) reacting said acid gel slurry with a base to precipitate alumina and to obtain a silica-alumina hydrogel catalyst slurry having a pH of about 4.5 to 6;
    (e) recovering the hydrogel from said slurry; and
    (f) washing, forming and drying said hydrogel to obtain dense, attrition resistant catalyst particles.

2. The process of claim 1 wherein said pH at step (c) is lowered to a level of from about 3.5 to 3.9.

3. The method of claim 1 wherein said acid aluminum salt is aluminum sulfate.

4. The process of claim 1 wherein said alkaline gel slurry at step (b) has a pH of about 12.

5. The method of claim 1 wherein said hydrogel is combined with crystalline alumina silicate zeolite and/or clay.

6. A cracking catalyst prepared by way of the process of claim 1.

7. A catalyst of claim 6 which contains from about 10 to 30 percent by weight of a crystalline alumino-silicate zeolite, and 15 to 25 percent by weight clay.

8. The catalyst of claim 7 wherein said zeolite is exchanged with rare earth metal ions.

* * * * *